United States Patent
Park (10) Patent No.: US 7,012,358 B2
(45) Date of Patent: Mar. 14, 2006

(54) COLOR CATHODE RAY TUBE WITH INNER SHIELD MOUNTED TO THE FRAME OF THE MASK

(75) Inventor: Jae Kyu Park, Gyeongeangbuk-do (KR)

(73) Assignee: LG. Philips Displays Korea Co., Ltd., Gyeongsangbuk-do (KR)

( * ) Notice: Subject to any disclaimer, the term of this patent is extended or adjusted under 35 U.S.C. 154(b) by 9 days.

(21) Appl. No.: 10/773,271

(22) Filed: Feb. 9, 2004

(65) Prior Publication Data
US 2004/0217685 A1  Nov. 4, 2004

(30) Foreign Application Priority Data
Feb. 10, 2003  (KR)  ...................... 10-2003-0008301

(51) Int. Cl.
*H01J 29/80* (2006.01)
(52) U.S. Cl. .................................. 313/402; 313/477 R
(58) Field of Classification Search ........ 313/402–408, 313/479, 239, 313; 348/818, 820
See application file for complete search history.

(56) References Cited

U.S. PATENT DOCUMENTS

| | | | |
|---|---|---|---|
| 4,535,907 A * | 8/1985 | Tokita et al. ............ | 220/2.1 A |
| 5,097,174 A * | 3/1992 | D'Amato .................... | 313/402 |
| 5,363,010 A * | 11/1994 | Van Mensvoort ........... | 313/402 |
| 5,519,283 A * | 5/1996 | Opresko et al. ............ | 313/479 |
| 5,773,924 A * | 6/1998 | Nakamura .................. | 313/402 |
| 6,509,683 B1 * | 1/2003 | Lee ......................... | 313/477 R |
| 6,555,951 B1 * | 4/2003 | Jeoung ...................... | 313/408 |
| 6,566,802 B1 * | 5/2003 | Jeong ..................... | 313/477 R |
| 6,765,343 B1 * | 7/2004 | Kim ....................... | 313/477 R |
| 6,768,253 B1 * | 7/2004 | Iwamoto et al. ............ | 313/479 |
| 6,847,160 B1 * | 1/2005 | Kim ....................... | 313/477 R |
| 6,876,138 B1 * | 4/2005 | Baek ......................... | 313/440 |
| 6,885,143 B1 * | 4/2005 | Kim ....................... | 313/477 R |
| 2005/0134165 A1 * | 6/2005 | Baek ....................... | 313/477 R |

\* cited by examiner

*Primary Examiner*—Joseph Williams
*Assistant Examiner*—Dalei Dong
(74) *Attorney, Agent, or Firm*—Birch, Stewart, Kolasch & Birch, LLP (57) ABSTRACT

The present invention relates to a color cathode ray tube and more specifically to a color cathode ray tube in which electron beam landing errors caused by terrestrial magnetism are corrected such that color purity is improved. The color cathode ray tube in accordance with the present invention comprises a panel having a phosphor screen formed on an inner surface thereof; a funnel joined to the panel; an electron gun generating electron beams; a frame mounted to the panel; a shadow mask mounted to the frame; and an inner shield mounted to the frame, wherein ISH/OAH is in a range of 1.8 to 3.0 wherein OAH is a height of the panel and ISH is a height of the inner shield.

7 Claims, 6 Drawing Sheets

COLOR CATHODE RAY TUBE WITH INNER SHIELD MOUNTED TO THE FRAME OF THE MASK

This Nonprovisional application claims priority under 35 U.S.C. § 119(a) on Patent Application No. 10-2003-8301 filed in Korea on Feb. 10, 2003, the entire contents of which are hereby incorporated by reference.

BACKGROUND OF THE INVENTION

1. Field of the Invention

The present invention relates to a color cathode ray tube and more specifically to a color cathode ray tube in which electron beam landing errors caused by terrestrial magnetism are corrected such that color purity is improved.

2. Description of the Background Art

Figure 1:
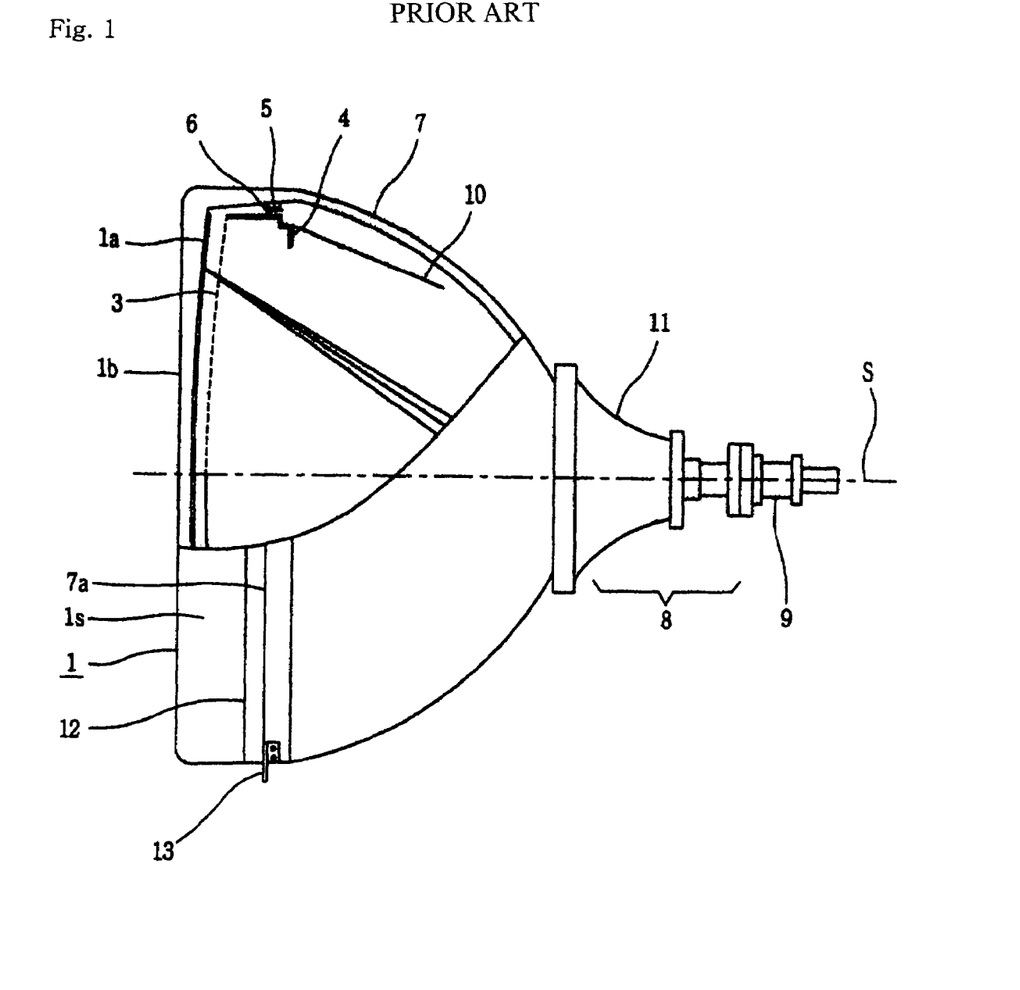
FIG. 1 shows a schematic diagram illustrating the structure of a general color cathode ray tube.

FIG. 1 shows a schematic diagram illustrating the structure of a general color cathode ray tube.

As shown in FIG. 1, the color cathode ray tube generally includes a glass envelope having a shape of bulb and being comprised of a panel 1, a tubular neck 8, and a funnel 7 connecting the panel 1 and the neck 8. The panel 1 comprises faceplate portion 1b and peripheral sidewall portion 1s sealed to the funnel 7. A phosphor screen 1a is formed on the inner surface of the faceplate portion 1b. A multi-apertured color selection electrode, i.e., shadow mask 3 is mounted to the screen with a predetermined space. The shadow mask 3 is hold by a peripheral frame 4.

An electron gun 9 is mounted within the neck 8 to generate and direct electron beams along paths through the mask 3 to the screen 1a. The shadow mask 3 and the frame 4 constitute a mask-frame assembly. The mask-frame assembly is joined to the panel 1 by means of springs 6.

The cathode ray tube further comprises an inner shield 10 for shielding the tube from terrestrial magnetism, a reinforcing band 12 attached to the sidewall portion 1s of the panel 1 to prevent the cathode ray tube from being exploded by external shock, external deflection yokes 11 located in the vicinity of the funnel-to-neck junction, and rug 13 fixing color cathode ray tube.

After image signal is input to the electron gun 9, electron beams are generated by the electron gun 9. Then, the electron beams are deflected in both vertical and horizontal directions by the deflection yoke 11. The electron beams are accelerated and collected such that they approach the screen.

The electron beams are selected depending on the colors by the shadow mask 3 and impinge on the phosphor screen 1a such that the phosphor screen 1a emits light in different colors.

After the electron beams reach the screen, a desired image is displayed on the screen. In order to make the electron beam move efficiently, the bulb is maintained at a vacuum state.

Since the cathode ray tube is evacuated, it suffers from high tensile and compressive stress. The cathode ray tube may easily be exploded due to external pressure. Moreover, if the bulb structure is exploded, glass fragments may be scattered due to the explosion. To prevent the cathode ray tube from being exploded by external shock, the weak portion of the cathode ray tube should be reinforced.

On the other hand, In the current display device market, the display device must be slimed to reduce the space for installing it and the weight of it.

Recently, slim-type display devices such as Liquid Cristal Display (LCD) and Plasma Display Panel (PDP) were developed. In comparison with those slim-type display devices, cathode ray tubes are relatively large and heavy and, therefore, guaranteeing the installing space for the cathode ray tube becomes more difficult. Therefore, size reduction of a cathode ray tube is necessary. Further, if a cathode ray tube becomes slim sized, both weight and cost also is reduced.

However, since the cathode ray tube is evacuated and the bulb of the cathode ray tube is made of glass, if the cathode ray tube is slim sized, the cathode ray tube may easily suffer from weakness.

Figure 2:
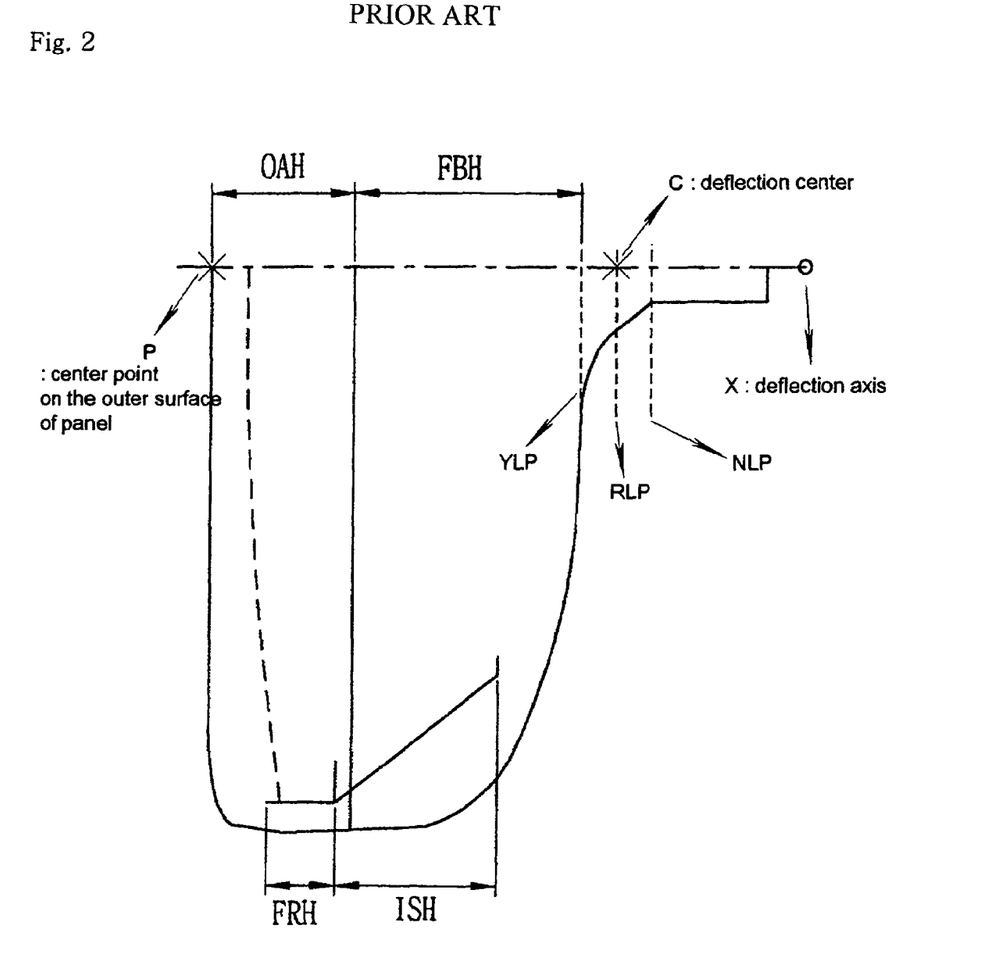
FIG. 2 shows a schematic diagram of a cathode ray tube for illustrating definitions of parameters used hereinafter.

FIG. 2 shows a schematic diagram of a cathode ray tube for illustrating definitions of parameters used hereinafter. As shown in FIG. 2, hereinafter, the cathode ray tube structure is described by utilizing the following names or terminologies.

Deflection axis X means extension line of the central axis of the electron gun through the screen.

Panel outer center P means intersection of the deflection axis X and the outer surface of the panel.

Seal line plane SLP is a vertical plane which is perpendicular to the deflection axis X and includes a closed line through which the panel and the funnel is sealed together.

Yoke line plane YLP means a vertical plane which is perpendicular to the deflection axis X and includes a boundary line between the body and yoke portions of the funnel.

Neck line plane NLP means a vertical plane which is perpendicular to the deflection axis X and includes a closed line through which the neck portion and the funnel is sealed together.

Reference line plane RLP means a vertical plane which is perpendicular to the deflection axis X and includes the deflection center.

Height of the inner shield ISH is height of the inner shield in the direction of deflection axis X.

Height of the frame FRH is height of the frame in the direction of deflection axis X.

Height of the panel OAH is distance between the panel outer center P and the seal line plane SLP.

Length of body portion of the funnel FBH is distance between the seal line plane SLP and the yoke line plane YLP.

In the conventional color cathode ray tube, a ratio FRH/OAH is not less than 0.45, a ratio ISH/OAH is in the range of 1.0 to 1.7 and a ratio ISH/FRH is in the range of 2.0 to 4.0.

Recently, as outer surface of the panel of color cathode ray tube becomes substantially flat, radius of curvature of the outer surface of the panel becomes in the range of 30,000 mm to 100,000 mm and radius of curvature of the inner surface of the panel becomes in the range of 1,000 mm to 5,000 mm.

When making a flat type cathode ray tube, because of many reasons such as sharing of facilities, usually the OAH remains same while length of skirt portion of the panel becomes longer. Therefore, the FRH becomes longer accordingly.

In the color cathode ray tube recently appeared, FRH/OAH becomes no less than 0.45 such that FRH becomes almost half of the OAH. As the FRH becomes longer, surface area of the frame becomes larger and, therefore, it takes long time for the frame to reach thermal equilibrium. Therefore, color purity at the screen is degraded.

Typically, about 15~40% of the electrons from the electron guns pass through the apertures of the shadow mask. Those electrons which fail to pass through the apertures impinge upon the shadow mask, producing heat and raising temperature of the mask. Because the mask is thermally expanded, position of the apertures at the shadow mask is accordingly shifted from the desired position. Furthermore, the heat is transferred from the mask to the frame and, therefore, the frame is also expanded. Then, the shift of the position of the apertures is increased due to the expansion of the mask.

Figure 3:
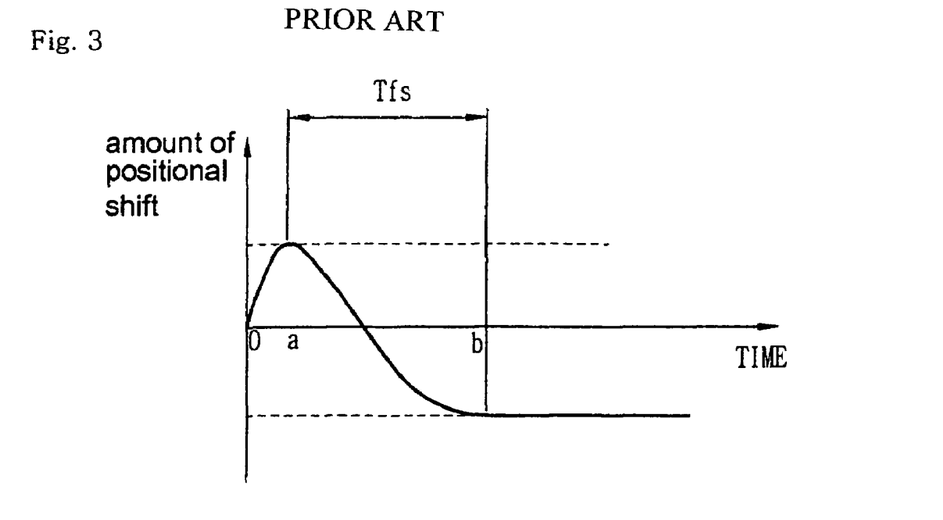
FIG. 3 shows a graph showing variation of extent of positional shift of electrons landing incorrectly at the screen with respect to time after the cathode ray tube is operated.

The above-mentioned phenomenon is described hereinafter referring to FIG. 3. FIG. 3 shows a graph showing variation of extent of positional shift of electrons landing incorrectly at the screen with respect to time after the cathode ray tube is operated.

In the period (a~b), as heat at the shadow mask is transferred to the frame, the frame is heated and expanded. Accordingly, the positional shift of the electron landing is decreased. As the heat dissipation through the frame continues, the landing position of the electron beam is varied to the opposite direction with respect to the initial shift just after the operation of the cathode ray tube.

After the time b, the shadow mask no longer deform because of thermal equilibrium with the frame. The time Tfs taken to reach thermal equilibrium of the frame and the mask is directly proportional to the surface area of the frame.

As the surface area of the frame becomes larger, heat capacity of the frame also becomes larger. Therefore, this makes Tfs longer and degrades color purity at the screen.

If deflection angle remains same, when the height of the panel OAH is longer, the height of the body portion of the funnel FBH is shorter. Deflection angle is an angle made with the deflection axis X and a line connecting the deflection center and a diagonal end of the effective screen.

In order to make the deflection angle constant, the height of the panel OAH and the height of the body portion of the funnel FBH must be constant. If the OAH is greater, the FBH is smaller.

As described hereinabove, as height of the skirt portion becomes larger, proportion of the panel in the overall length of the color cathode ray tube becomes larger. Thus, the FBH decreases and radius of curvature of the body portion of the funnel decreases. Consequently, the body portion of the funnel suffers from compressive stress due to atmosphere pressure. The shock-resistive characteristic of the color cathode ray tube is deteriorated. Especially when deflection angle decreases, radius of curvature of the body portion of the funnel highly decreases and, therefore, shock-resistive characteristic is deteriorated.

Figure 4:
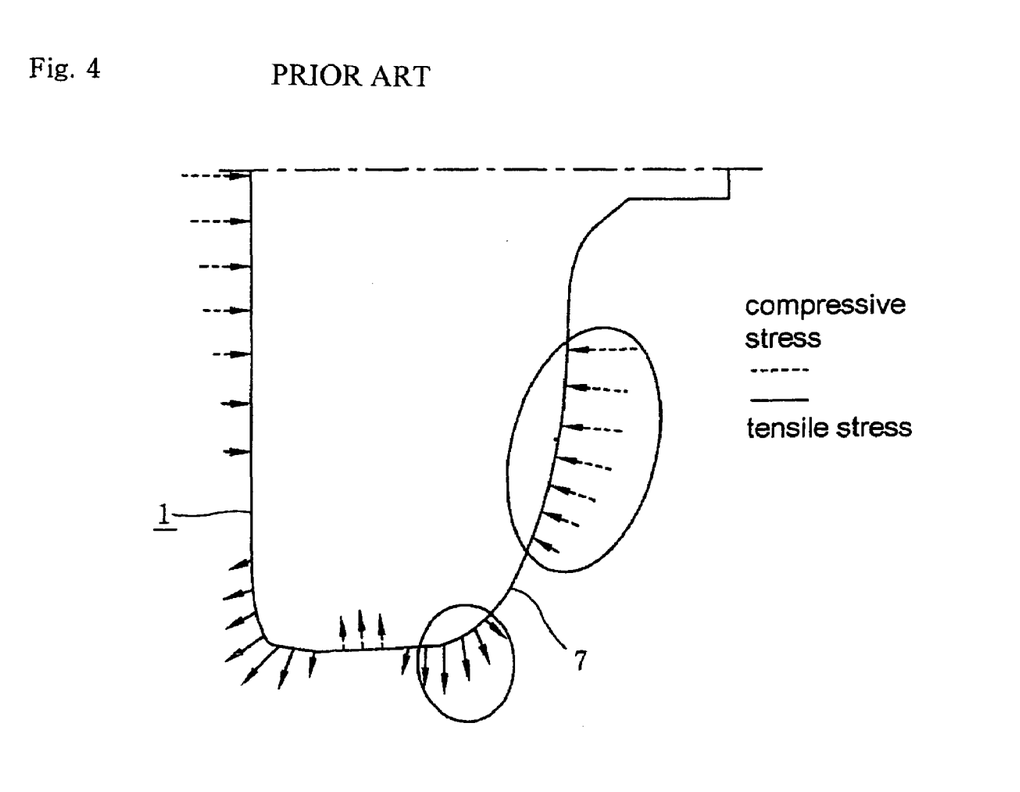
FIG. 4 shows a diagram for showing stress distribution on the conventional color cathode ray tube.

FIG. 4 shows a diagram for showing stress distribution on the conventional color cathode ray tube.

As shown in FIG. 4, as the curvature of the funnel body portion becomes smaller, the tensile stress (solid arrow) at the portion adjacent to the seal line plane SLP and the compressive stress (dotted arrow) of the body portion of the funnel become larger. Consequently, shock-resistive characteristic is deteriorated.

As the volume of the panel 1 becomes greater in comparison with the funnel 7, the weight of the color cathode ray tube and the manufacturing costs increase.

Because the skirt portion of the panel is made thick, the overall weight of the color cathode ray tube increases. Further, since proportion of the panel price in the overall cost is high, the manufacturing cost of a color cathode ray tube also increases.

In a conventional color cathode ray tube, ISH/OAH is in the range of 1.0 to 1.7. Because the height of the inner shield is very small, shielding effect of the inner shield decreases.

Figure 5:
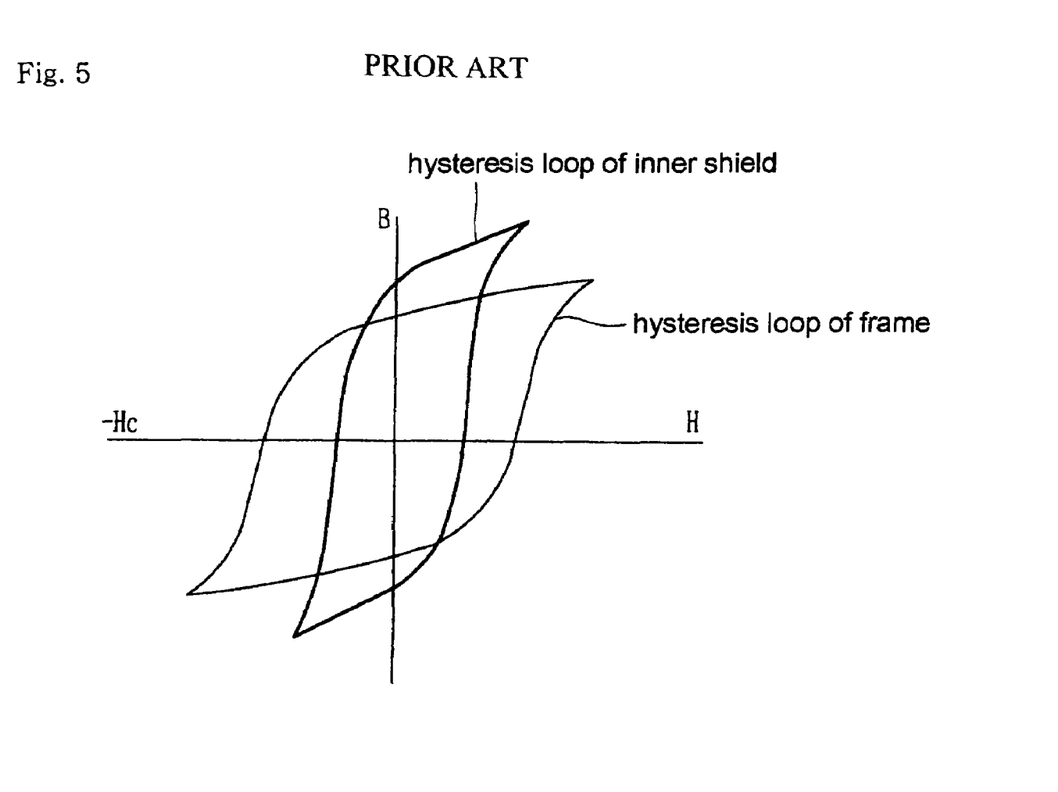
FIG. 5 shows hysteresis loop of the inner shield and frame of the background art.

FIG. 5 shows hysteresis loop of the inner shield and frame of the background art.

As shown in FIG. 5, the terrestrial magnetism is partly shielded by shadow mask, frame and inner shield which are made of metal. The magnetic permeability and coercive force of the metallic device are closely related to the shielding of the terrestrial magnetism.

As the magnetic permeability becomes greater and the coercive force becomes less, the metallic device can shield the terrestrial magnetism effectively.

As either the magnetic permeability becomes greater or the coercive force becomes less, the metallic device can shield the terrestrial magnetism efficiently. The maximum of the magnetic permeability of the inner shield material is in the range of $2,000\mu$ to $10,000\mu$ and initial value $\mu i$ is not greater than 2,000. The coercive force of the inner shield material is not less than 0.3 Oe. Therefore, the inner shield can shield the terrestrial magnetism more efficiently than the frame can do.

In the conventional color cathode ray tube, a ratio ISH/FRH is in the range of 2.0 to 4.0. Therefore, proportion of the inner shield in the overall length of the color cathode ray tube is very small and, consequently, proportion of the frame becomes greater and the shielding efficiency of a color cathode ray tube decreases.

SUMMARY OF THE INVENTION

An object of the present invention is to provide a color cathode ray tube where landing error problem causing degradation of color purity is prevented.

Another object of the present invention is to provide a color cathode ray tube where electron beam deflection due to the terrrestrial magnetism is reduced, such that color purity is improved.

Another object of the present invention is to provide a color cathode ray tube where overall cost for making a color cathode ray tube and the weight of a color cathode ray tube is reduced.

According to an aspect of the present invention, a cathode ray tube comprises a panel having a phosphor screen formed on an inner surface thereof; a funnel joined to the panel; an electron gun generating electron beams; a frame mounted to the panel; a shadow mask mounted to the frame; and an inner shield mounted to the frame, wherein ISH/OAH is in a range of 1.8 to 3.0 wherein OAH is a height of the panel and ISH is a height of the inner shield.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Figure 6:
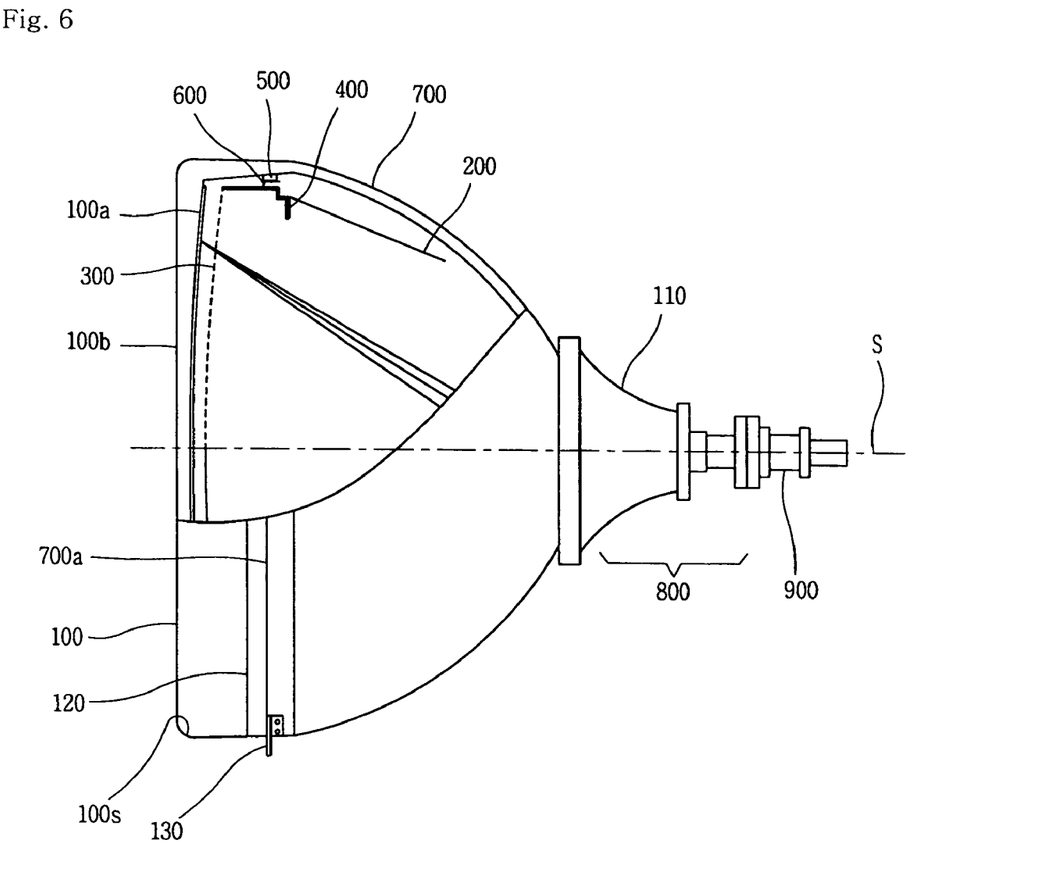
FIG. 6 shows a schematic diagram illustrating the structure of a color cathode ray tube of the present invention.

FIG. 6 shows a schematic diagram illustrating the structure of a color cathode ray tube of the present invention.

Figure 7:
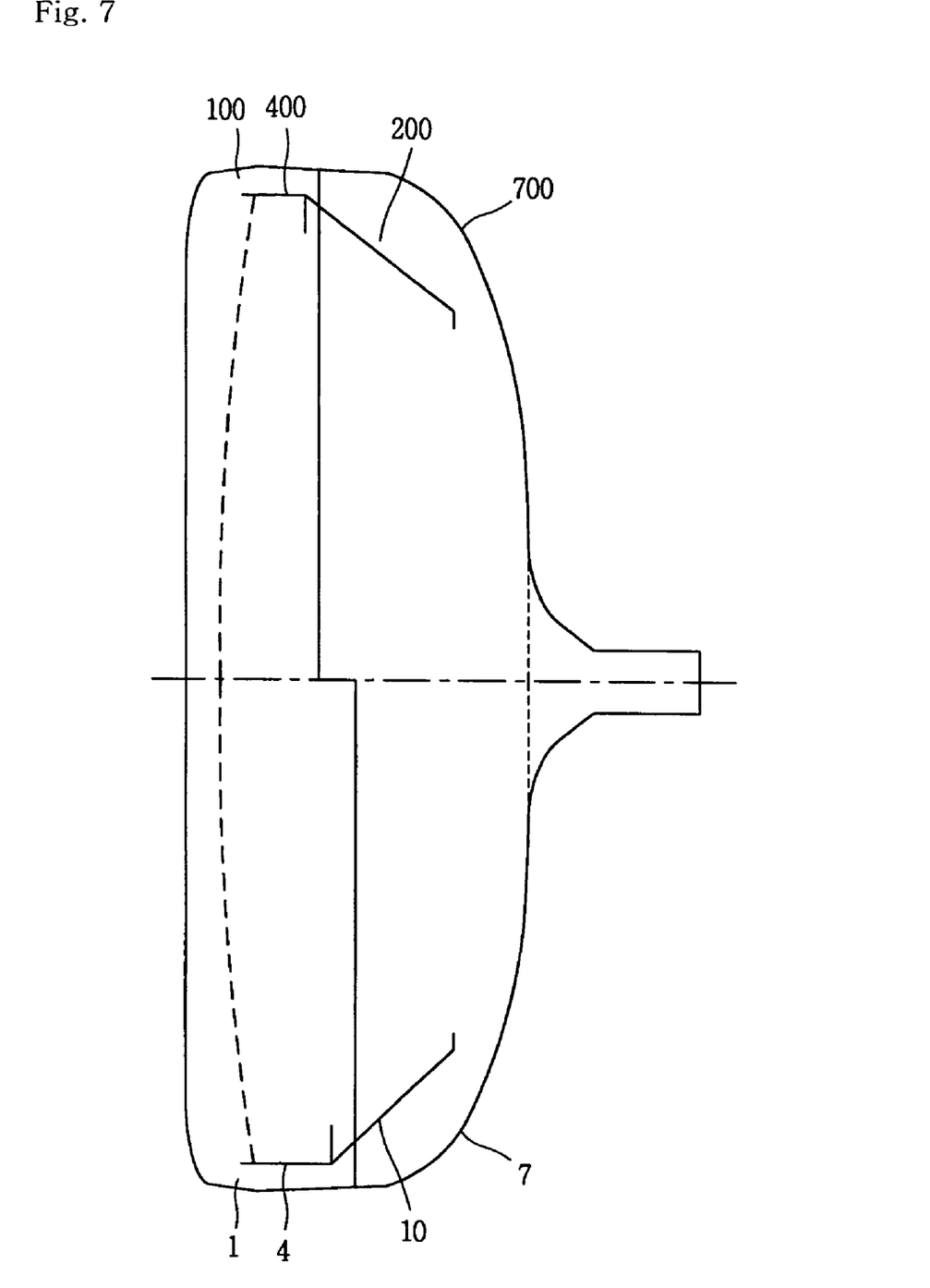
FIG. 7 shows a schematic diagram comparing a color cathode ray tube of the present invention with a general color cathode ray tube.

FIG. 7 shows a schematic diagram comparing a color cathode ray tube of the present invention with a general color cathode ray tube.

As shown in FIG. 6, the color cathode ray tube in accordance with the present invention includes a glass envelope having a shape of bulb and being comprised of a panel 100, a tubular neck 800, and a funnel 700 connecting the panel 100 and the neck 800. The panel 100 comprises faceplate portion 100b and peripheral sidewall portion 100s sealed to the funnel 700. A phosphor screen 100a is formed on the inner surface of the faceplate portion 100b. A multi-apertured color selection electrode, i.e., shadow mask 300 is mounted to the screen with a predetermined space. The shadow mask 300 is hold by a peripheral frame 400.

An electron gun 900 is mounted within the neck 800 to generate and direct electron beams along paths through the mask 300 to the screen 100a.

The shadow mask 300 and the frame 400 constitutes a mask-frame assembly. The mask-frame assembly is joined to the panel 100 by means of springs 600.

The cathode ray tube further comprises an inner shield 200 for shielding the tube from terrestrial magnetism, a reinforcing band 120 attached to the sidewall portion 100s of the panel 100 to prevent the cathode ray tube from being exploded by external shock, external deflection yokes 110 located in the vicinity of the funnel-to-neck junction, and rug 130 fixing color cathode ray tube.

According to the embodiment of the present invention, a ratio ISH/OAH is in the range of 1.8 to 3.0. A ratio FRH/OAH is in the range of 0.1 to 0.4. A ratio ISH/FRH is greater than or equal to 5.0.

Table 1 is a table comparing the embodiment of the present invention with a general color cathode ray tube.

TABLE 1

| | The Back Ground Art | The Present Invention |
|---|---|---|
| ISH/OAH | 1.0~1.7 | 1.8–3.0 |
| FRH/OAH | greater than or equal to 0.45 | 0.1~0.4 |
| ISH/FRH | 2.0~4.0 | greater than or equal to 5.0 |

As shown in Table 1, in the color cathode ray tube, as the OAH becomes less and the ISH becomes greater, the proporportion of the inner shield 200 in the overall length of the color cathode ray tube becomes greater and, therefore, shielding effect of the inner shield increases.

If the OAH becomes less, the FRH can be less. The height of the frame FRH is determined in accordance with the radius of curvature of the faceplate portion of the shadow mask. Therefore, the location at which the distance between the inner surface of the panel and the frame is greatest is selected to be the reference point to determine the FRH.

If the distance between the frame and the inner surface of the panel is too small, scars are easily made during installing and disassembling of the shadow mask. Therefore, the distance between the frame and the inner surface of the panel must be greater than or equal to about 5 mm.

If the OAH is reduced, the FRH can be reduced by about 20~40% from the conventional color cathode ray tube. As the FRH decreses, the overall surface area of the frame decreases and, consequently, the time during which the frame is thermally-expanded due to thermal conduction from the shadow mask to the frame becomes less.

As described above in connection with FIG. 3, the Tfs is shortened in accordance with the reduction of the surface area of the frame.

If the OAH becomes less and the deflection angle remains same, the length of the funnel body portion can be made greater and, consequently, the ISH can be made greater.

As the ISH becomes greater, the proportion of the inner shield in the overall length of a color cathode ray tube becomes greater and, consequently, the shielding characteristic of color cathode ray tube is improved.

The ISH is constrained by the FBH. Therefore, as the FBH becomes greater, the ISH becomes greater.

As described above, It is preferable that the ratio ISH/OAH is in the range of 1.8 to 3.0 according to the present invention.

If the ISH/OAH is less than 1.8, the proportion of the inner shield in overall length of the color cathode ray tube decreases and, consequently, the shielding efficiency of terrestrial magnetism decreases.

Also, in order to provide the space for installing the shadow mask and the frame, the ISH/OAH must be less than or equal to 3.0. If the ISH/OAH is greater than 3.0, it becomes hard to install the frame or the inner shield interferes the funnel body portion.

If the ISH/OAH is in the range of 1.8 to 3.0, the proportion of the panel in the color cathode ray tube decreases. Then, since the panel is more expensive than the funnel, it is possible to reduce the manufacturing cost of the color cathode ray tube.

Moreover, the panel is typically heavier than the funnel. This is because the skirt portion of the panel is formed thick in order to improve the shock-resistive characteristic and the faceplate portion of the panel is formed thick in order to provide screen.

In the present invention, since the panel is two times as heavy as the funnel, it is possible to decrease weight of the color cathode ray tube by reducing the weight of the panel.

Accordingly the height of the funnel body portion becomes greater instead of decreasing the height of the panel skirt portion. Then, the weight and manufacturing cost of the color cathode ray tube decrease.

As the height of the funnel body portion becomes greater, the radius of curvature of the funnel body portion becomes greater. Therefore, the compressive stress and tensile stress of the funnel decrease and, consequently, the shock-resistive characteristic is improved.

Further, in the present invention, since it is necessary to ensure the space for installing the shadow mask and the frame, it is preferable that the FRH/OAH is in the range of 0.1 to 0.4. If the FRH/OAH is less than 0.1, it becomes hard to install the frame.

Further, according to the present invention, in order to improve the shielding characteristic of the inner shield, it is preferable that the ISH/FRH is greater than or equal to 5.0.

Further, the every embodiments described hereinabove may be applied to flat type color cathode ray tube where front face surface of panel is substantially flat. Therefore, the effect of the present invention is still effective for the flat type color cathode ray tube.

As described hereinabove, the present invention may accomplish the effect that landing error problem causing degradation of color purity is reduced.

Further, the present invention may accomplish the effect that electron beam deflection due to the terrrestrial magnetism is reduced, such that color purity is improved.

Further, the present invention may accomplish the effect that overall cost for making a color cathode ray tube and the weight of a color cathode ray tube is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color cathode ray tube comprising:
    a panel having a phosphor screen formed on an inner surface thereof;
    a funnel joined to the panel;
    an electron gun generating electron beams;
    a frame mounted to the panel;
    a shadow mask mounted to the frame; and
    an inner shield mounted to the frame, wherein ISH/OAH is in a range of 1.8 to 3.0 where OAH is a height of the panel and ISH is a height of the inner shield.

2. The color cathode ray tube of claim 1, wherein FRH/OAH is in a range of 0.1 to 0.4, where FRH is a height of the frame.

3. The color cathode ray tube of claim 1, wherein ISH/FRH is greater than or equal to 5.

4. The color cathode ray tube of claim 3, wherein an outer surface of said panel is substantially flat.

5. A color cathode ray tube comprising:
    a panel having a phosphor screen formed on an inner surface thereof;
    a funnel joined to the panel;
    an electron gun generating electron beams;
    a frame mounted to the panel;
    a shadow mask mounted to the frame; and
    an inner shield mounted to the frame, wherein FRH/OAH is in a range of 0.1 to 0.4, where OAH is a height of the panel and FRH is a height of the frame.

6. The color cathode ray tube of claim 5, wherein ISH/FRH is greater than or equal to 5, where ISH is a height of the inner shield.

7. The color cathode ray tube of claim 5, wherein an outer surface of said panel is substantially flat.

* * * * *